United States Patent [19]

Green

[11] Patent Number: 5,301,857
[45] Date of Patent: Apr. 12, 1994

[54] BOTTLE HOLDER WITH BOTTLE-NECK GRIP AND LOGO

[76] Inventor: Brian J. Green, 22 Granite Road, Gilford, Conn. 06437

[21] Appl. No.: 966,453

[22] Filed: Oct. 26, 1992

[51] Int. Cl.$^5$ ............................................. A45F 5/00
[52] U.S. Cl. .................................... 224/148; 224/252; 224/249; 224/247; 215/100 A
[58] Field of Search ............... 224/148, 252, 249, 247; 215/100 A, 101; 248/312; D3/106, 48; D7/607, 608, 619, 620, 624; D24/199

[56] References Cited

U.S. PATENT DOCUMENTS

| | | | |
|---|---|---|---|
| 2,759,756 | 8/1956 | Sikora | 215/101 |
| 2,926,403 | 3/1960 | Weissman | 224/247 |
| 3,463,536 | 8/1969 | Updegraff et al. | 215/100 A |
| 4,120,434 | 10/1978 | Hewes | 224/249 |
| 4,498,613 | 2/1985 | Donahue et al. | 224/148 |
| 5,167,354 | 12/1992 | Cohanfard | 224/148 |
| 5,203,481 | 4/1993 | Dobbins | 224/148 |

Primary Examiner—Linda J. Sholl
Attorney, Agent, or Firm—Donald W. Meeker

[57] ABSTRACT

A truncated cone shaped holder with a serrated top opening receives and grips any size bottle around the neck with opposing support tabs. The broad cone surface imprinted with a logo covers a substantial portion of the bottle. A bracket with a protruding hook connects to the base of the cone with a living hinge. A pin may connect the cone to the bracket to maintain the bracket in a vertical orientation. The holder hooks onto a belt, waistband, bicycle cable, vehicle window, desk handle or other element. The bottle is released by squeezing in two opposing sides of the base of the cone to widen the top opening and release the support tabs from the bottle neck. Alternately pull tabs on the support tabs release the bottle. The holder may be formed in one piece by molding flexible plastic. The hook bracket lays flat for stacking the units for shipping and storing.

5 Claims, 1 Drawing Sheet

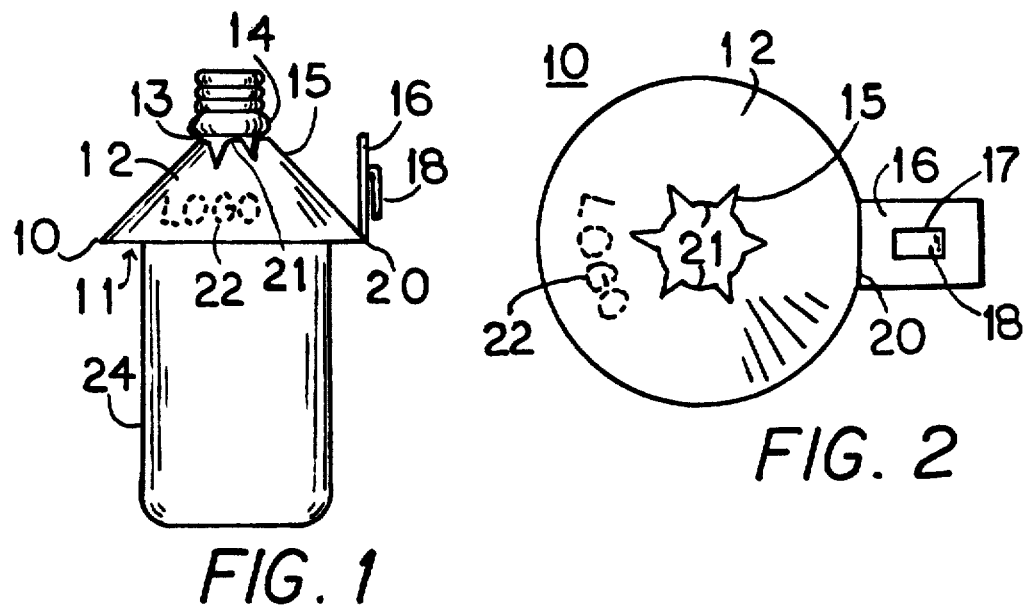
FIG. 1
FIG. 2
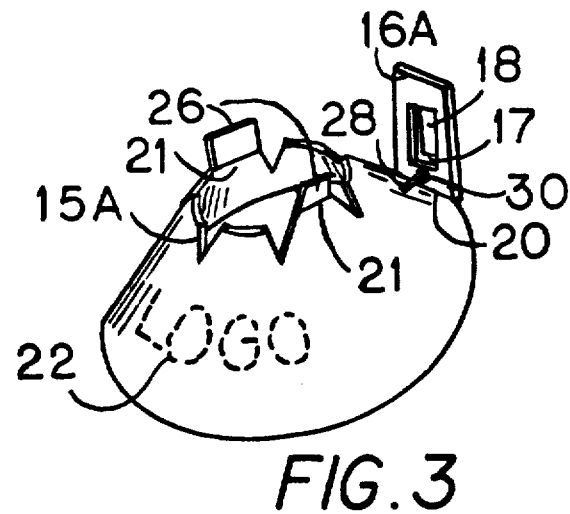
FIG. 3

BOTTLE HOLDER WITH BOTTLE-NECK GRIP AND LOGO

BACKGROUND OF THE INVENTION

1. Technical Field

The present invention relates to portable bottle holding devices and in particular to a hook supported bottle holder with a bottle-neck grip and a logo.

2. Description of the Prior Art

A number of concerns and trends have brought about an unprecedented widespread use of portable bottles carried around with people. The current major interest in fitness activity and its related liquid intake requirement prompts runners, bikers, skateboarders, hikers, and other active people outdoors to carry a water bottle with them. A general concern about the availability of pure drinking water has also prompted many people to carry their own water with them in their daily activities. Environmentally concerned individuals often carry their own empty bottles with them to use in place of disposable cups normally provided with take-out drink orders. In addition, people engaged in recreational activity at beaches, parks, tourist sites, or other outdoor locations often buy bottles of soda, water, or other liquid refreshment to enjoy as thirst quenchers in their activities. There is an associated problem in all of these cases in terms of what to do with the bottle while engaged in activities requiring the use of the hands.

Another widespread activity is the use of advertising, particularly on articles of clothing and especially on athletic clothing and accessories. Companies promoting individual athletes or teams or particular sporting events always provide clothing or accessories bearing the company name.

While there have been a number of devices attached to the body for holding cups (U.S. Pat. Nos. 3,380,635; 4,708,273), cans (U.S. Pat. Nos. 4,993,611; 5,048,734; Des 276,760); thermos bottles (U.S. Pat. Nos. 3,369,723; 4,848,625) and belt attached holders for a variety of other items (U.S. Pat. Nos. 1,464,659; 4,120,434), many of them are somewhat complex and none provide for holding the necks of bottles which are uniform in size for a wide variety of bottle types and quantities. In addition none provide a major advertising function.

DISCLOSURE OF INVENTION

The present invention a truncated cone-shaped bottle neck holder and clip which covers a substantial portion of the bottle and provides a broad surface upon which to present a logo for advertising purposes. Regardless of what type of bottle is being carried in the holder, the logo imprinted on the holder is visually dominant.

Providing a serrated small circular flexible opening in the center of the truncated cone-shaped holder enables the user to slip any size or type of bottle easily in the holder and have it held securely in place with the serrated neck of the holder under the protruding ring which is used universally around the neck of the bottle under the cap. Because bottle necks are universally the same size, the holder can be used with any size or type of bottle.

Providing a flexible truncated cone-shaped holder, formed preferably of molded plastic, the holder may be squeezed together at the base of the holder to broaden the opening at the serrated neck and thereby release the bottle quickly and easily for the user to drink from the bottle. Alternately, tabs may protrude from the serrated circular opening. In which case the tabs are pulled apart to release the bottle. After use, the bottle is then slipped back into the holder up through the base of the truncated cone portion with the neck protruding through the serrated circular opening where the serrated neck of the holder snaps tightly under the protruding ring on the bottle neck to hold the bottle securely in place.

Forming the holder all of one piece from molded plastic enables a simple inexpensive quick and easy method of fabrication for fast production in quantity. A hook bracket protruding from the base of the cone is separated from the cone by a living hinge formed by creating a thin straight line between the cone base and the hook bracket. A rectangular opening is formed in the hook bracket by pushing away the bracket material a short distance on three sides of the rectangular opening to form a hook parallel to the bracket. This construction allows the invention to be stacked in numbers for shipping, display and storage.

To wear the holder the hook bracket is folded upwardly at the living hinge and it is easily hooked into the belt or waistband on the clothing of the wearer. The bracket and hook also allows the bottle holder to be hooked over a vehicle window, a bicycle cable, a boat trim, or other surfaces on vehicles, or over narrow supports in buildings, such as a handle on a desk or file cabinet. A pin may be used protruding from the cone-shaped holder to snap into a small hole in the hook bracket (or alternately a pin from the hook bracket to a hole in the cone-shaped holder) to maintain the hook bracket perpendicular to the base of the cone-shaped holder.

BRIEF DESCRIPTION OF THE DRAWINGS

These and other details and advantages of my invention will be described in connection with the accompanying drawings, which are furnished only by way of illustration and not in limitation of the invention, and in which drawings:

FIG. 1 is a front elevational view of the preferred embodiment of the invention holding a bottle with the hook bracket in an upright position;

FIG. 2 is a top plan view of the preferred embodiment of the invention;

FIG. 3 is a perspective view of an alternate embodiment of the invention having neck opening tabs and a pin to maintain the hook bracket in a vertical position.

BEST MODE FOR CARRYING OUT THE INVENTION

In FIGS. 1 and 2 the preferred embodiment of the invention is a portable bottle holder 10 comprising a truncated hollow flexible cone shaped holder 12 open at both top and bottom ends. The bottom circular opening 11 is large enough to admit bottles of varying sizes within the opening, such as the plastic bottle 24 of FIG. 1 used for a variety of drinks, such as spring water, soda water, soda, and juice. The top circular opening 15 is serrated to form on opposite sides of the top at least two protruding support points 21. The top opening is the same size as a bottle neck 13 which can be inserted through the serrated opening and supported therein with a protruding ridge 14 around the bottle neck resting on the support points 21. Bottles of a wide variety of sizes and types all have the same size neck and can all be supported by the portable bottle holder.

Around the holder a broad sloped flexible surface 12 for bearing a logo 22 covers a substantial portion of the bottle, thereby making the logo on the portable bottle holder more visible than the name on the bottle. Squeezing the cone shaped holder 12 adjacent to the bottom circular opening 11 on opposite sides of the opening separates the support points 21 of the top opening and releases the bottle.

A hook bracket 16 protrudes vertically from an edge of the bottom circular opening. The hook bracket 16 is preferably attached to the cone shaped holder by a living hinge 20, so that the device can be formed by injection molding flexible plastic and the bracket can be folded down as in FIG. 2 for stacking, packing and shipping the devices. Protruding from the hook bracket 16, a hook means 18 is formed in the molding process by separating a portion of the hook bracket 16 a short distance from the hook bracket to form an opening 17 in the hook bracket. The separated portion 18 forms a hook attached to the opening from a top edge of the separated portion enabling the hook to slide down over an external element to sandwich the external element between the hook and the bracket to support the bottle holder. Thus the portable bottle holder may be hooked over a belt, waistband, bicycle cable, vehicle window, boat trim, desk or file handle, or any other element in an environment where it is desirable to have a bottled beverage readily available.

In FIG. 3 an alternate embodiment of the invention provides a straight pin 28 protruding from the cone holder adjacent to the hook bracket and an opening 30 in the hook bracket 16 to receive the pin snapped therein to hold the hook bracket rigidly in place in a vertical orientation. The pin could alternately protrude from the hook bracket and fit into an opening in the cone shaped holder. Normally the bottle might rest against the body of the user or against the side of any element to which the bottle holder might be hung. Should the bottle be suspended without a side contact, the pin would serve to maintain the bottle holder perpendicular to the hook bracket to hold the bottle in a vertical position.

A pair of pull tabs 26 could be attached to the support points 21 of the serrated opening 15 on opposite sides of the serrated opening so that pulling the pull tabs releases the bottle as an alternative to or in addition to squeezing the bottom of the cone shaped holder to release the bottle.

The entire portable bottle holder could be formed by injection molding a flexible plastic in one piece to form the invention.

It is understood that the preceding description is given merely by way of illustration and not in limitation of the invention and that various modifications may be made thereto without departing from the spirit of the invention as claimed.

I claim:

1. A portable bottle holder comprising
   a truncated hollow flexible cone shaped holder open at both top and bottom ends, wherein a bottom circular opening is large enough to admit bottles of varying sizes within the opening, a top circular opening serrated to form on opposite sides of the top at least two protruding support points is the same size as a bottle neck which can be inserted through the serrated opening and supported therein with a protruding ridge around the bottle neck resting on the support points, and a main body of the holder forming a substantial sloped flexible surface for bearing a logo and covering a substantial portion of the bottle, wherein squeezing the cone shaped holder adjacent to the bottom circular opening separates the support points and releases the bottle; and
   a bracket protruding vertically from an edge of the bottom circular opening, and protruding from the bracket a hook means for engaging external objects, wherein the bracket is attached to the cone shaped holder by a living hinge;
   a straight pin extending between the bracket and the cone shaped holder, with the pin snapped into a small hole, thereby connecting the bracket to the cone shaped holder to maintain the bracket rigidly in place perpendicular to a plane formed by the bottom opening of the cone shaped holder.

2. The invention of claim 1 wherein the hook means comprises a portion of the bracket separated a short distance from the bracket to form an opening and the separated portion forms a hook attached to the opening from a top edge of the separated portion enabling the hook to slide down over an external element to sandwich the external element between the hook and the bracket to support the bottle holder on the external element.

3. The invention of claim 1 further comprising a pair of pull tabs attached to the support points of the serrated opening on opposite sides of the serrated opening so that pulling the pull tabs releases the bottle.

4. The invention of claim 1 wherein the pin protrudes from the bracket and snaps into a hole in the cone shaped holder.

5. The invention of claim 1 wherein the pin protrudes from the cone shaped holder and snaps into a hole in the bracket.